(12) United States Patent
Hiramoto et al.

(10) Patent No.: US 7,112,550 B2
(45) Date of Patent: Sep. 26, 2006

(54) EXHAUST GAS PURIFYING CATALYST

(75) Inventors: Yoshiaki Hiramoto, Kanagawa-ken (JP); Masahiro Takaya, Kanagawa-ken (JP); Shinji Yamamoto, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 40 days.

(21) Appl. No.: 10/349,193

(22) Filed: Jan. 23, 2003

(65) Prior Publication Data

US 2003/0181316 A1    Sep. 25, 2003

(30) Foreign Application Priority Data

| Jan. 24, 2002 | (JP) | ............................. 2002-015010 |
| Feb. 12, 2002 | (JP) | ............................. 2002-033550 |
| Dec. 25, 2002 | (JP) | ............................. 2002-375121 |

(51) Int. Cl.
*B01J 29/06* (2006.01)

(52) U.S. Cl. .......................................... 502/64; 502/60

(58) Field of Classification Search ................. 502/60, 502/64
See application file for complete search history.

(56) References Cited

U.S. PATENT DOCUMENTS

| 4,134,860 A | 1/1979 | Hindin et al. |
| 4,451,517 A | 5/1984 | Inoguchi et al. |
| 5,208,206 A | 5/1993 | Yasaki et al. |
| 5,439,865 A | 8/1995 | Abe et al. |
| 2002/0004455 A1 | 1/2002 | Nakanishi et al. |
| 2003/0162650 A1 * | 8/2003 | Marques et al. ............... 502/64 |

FOREIGN PATENT DOCUMENTS

| EP | 0 766 994 A1 | 4/1997 |
| EP | 1 068 892 A2 | 1/2001 |
| JP | 53-135898 | 11/1978 |
| JP | 58-122044 A | 7/1983 |
| JP | 63-088040 A | 4/1988 |
| JP | 2-56247 A | 2/1990 |
| JP | 2-126937 A | 5/1990 |
| JP | 4-180840 A | 6/1992 |
| JP | 5-285386 A | 11/1993 |
| JP | 6-47279 A | 2/1994 |
| JP | 7-96177 A | 4/1995 |
| JP | 9-38500 A | 2/1997 |
| JP | 9-99217 A | 4/1997 |
| JP | 2001-232212 | 8/2001 |

OTHER PUBLICATIONS

Japanese Industrial Standard, "Iron and Steel—Methods for Determination of Nitrogen Content", JIS G 1228, 1997, pp. 1-44, (English version provided).
S. Yamamoto, et al., "In-line Hydrocarbon (HC) Adsorber System for Reducing Cold-Start Emissions", SAE Technical Paper Series 2000-01-0892, Mar. 2000, pp. 1-9.

* cited by examiner

*Primary Examiner*—Elizabeth D. Wood
(74) *Attorney, Agent, or Firm*—Foley & Lardner LLP

(57) ABSTRACT

An exhaust gas purifying catalyst includes a honeycomb substrate, and HC adsorbent layers containing zeolite and having a thickness ranging from 100 μm to 500 μm. Each of the HC adsorbent layers has an approximately circular surface on a cross section perpendicular to a direction where each of the cells of the honeycomb substrate is extended, and has circumferential-direction cracks extended in a circumferential direction and radial-direction cracks extended in a radial direction. The circumferential-direction cracks and the radical-direction cracks are unconnected to each other or are connected in an extent not to cause layer exfoliation in the HC adsorbent layers. A manufacturing method of the exhaust gas purifying catalyst is to coat slurry containing zeolite on the honeycomb substrate plural times, to dry or fire the coated slurry, and to form the HC adsorbent layers.

30 Claims, 13 Drawing Sheets

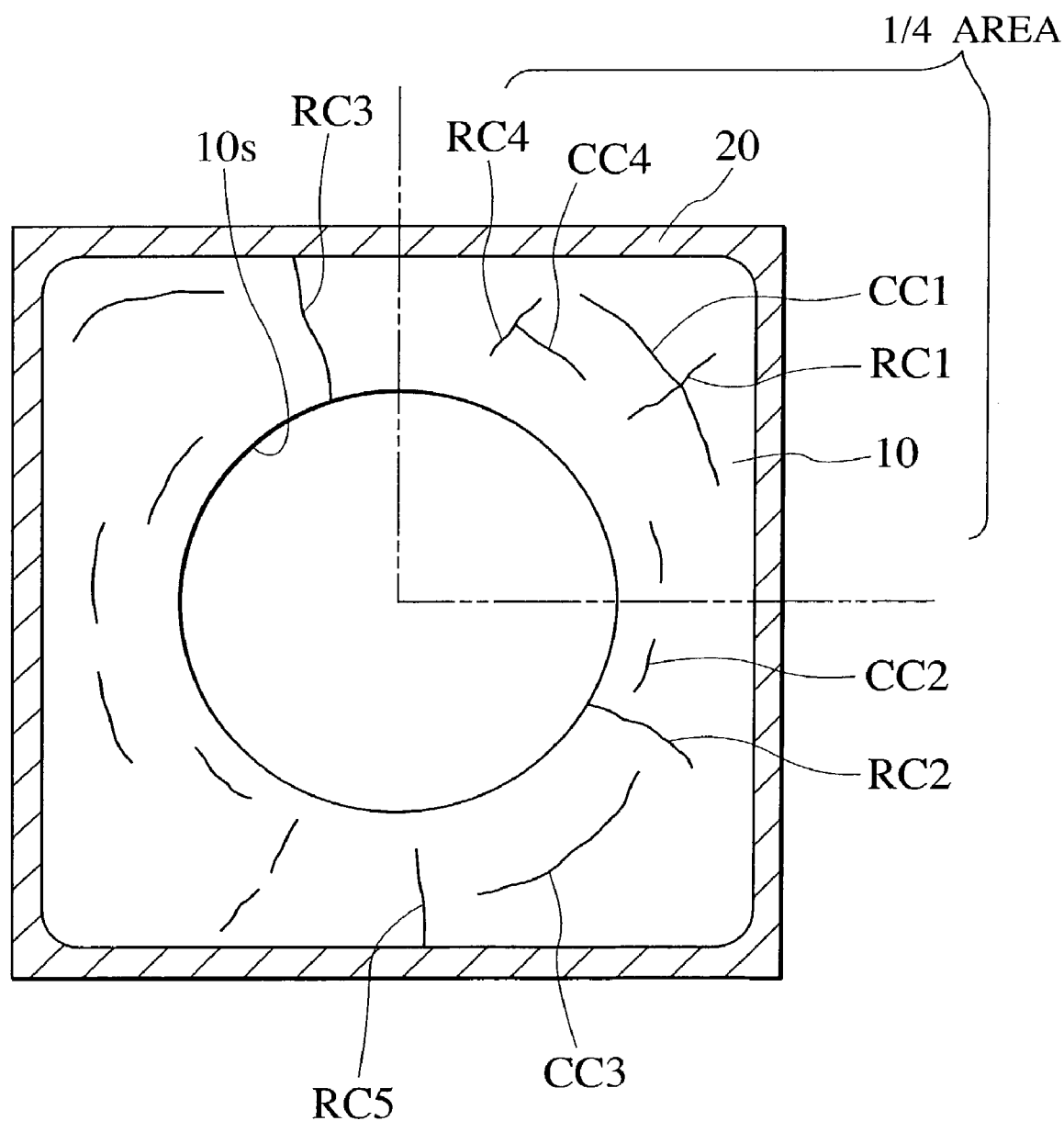

| | IMAGE I | IMAGE II | IMAGE III | |
|---|---|---|---|---|
| FIG.3A | 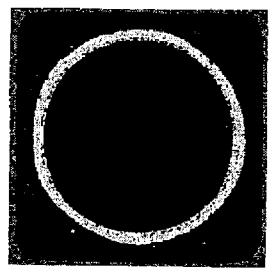 | 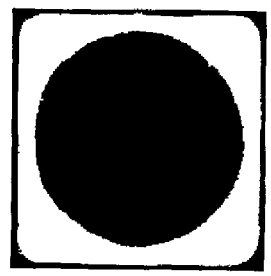 | 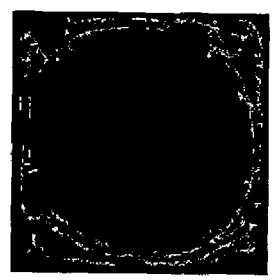 | 4% |
| FIG.3B | 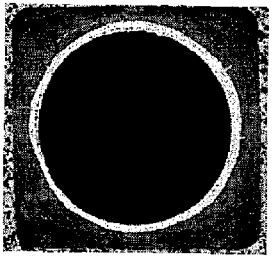 | 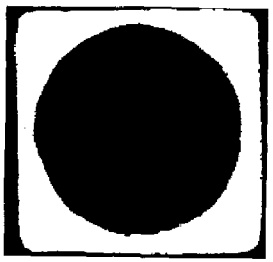 | 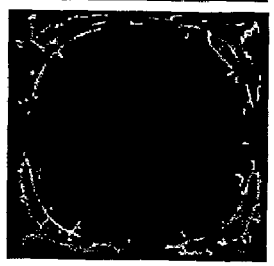 | 6% |
| FIG.3C | 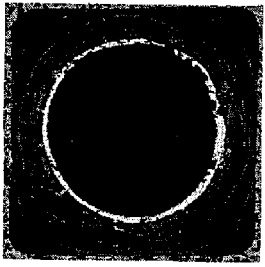 | 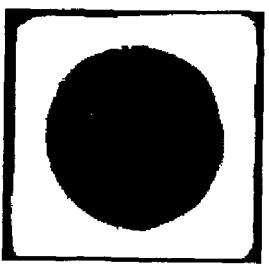 | 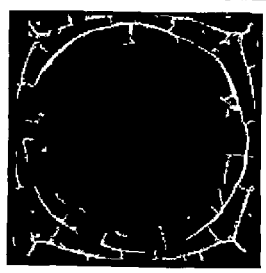 | 17% |

|        | IMAGE I | IMAGE II | IMAGE III |     |
|--------|---------|----------|-----------|-----|
| FIG.4A | 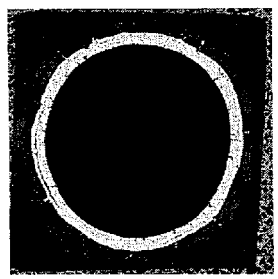 | 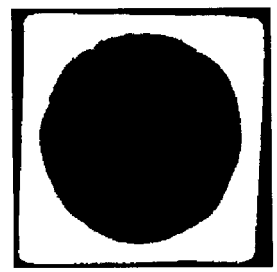 | 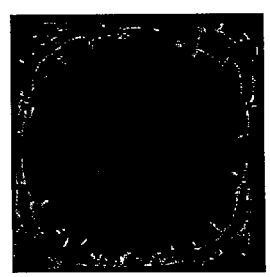 | 5% |
| FIG.4B | 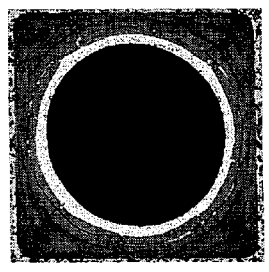 | 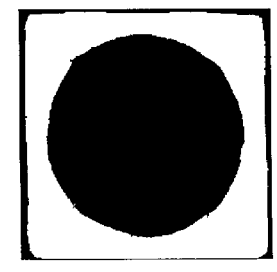 | 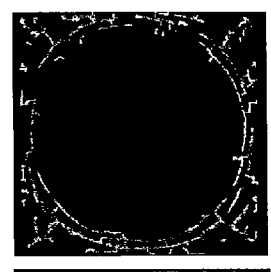 | 8% |
| FIG.4C | 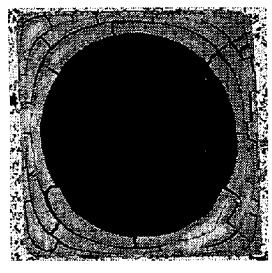 | 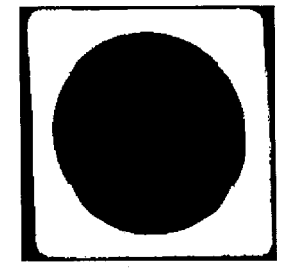 | 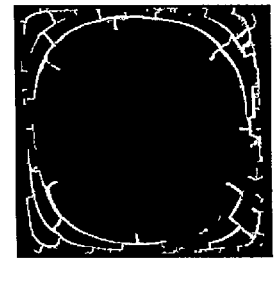 | 14% |

FIG.5A
EXAMPLE 1
IMAGE I      IMAGE II     IMAGE III
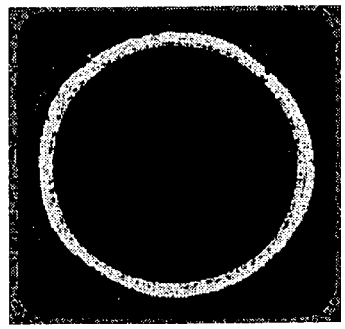 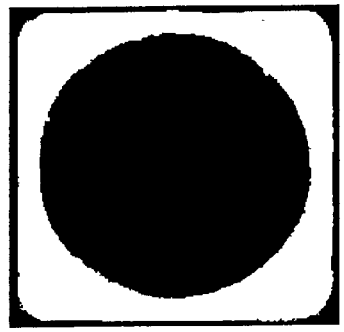 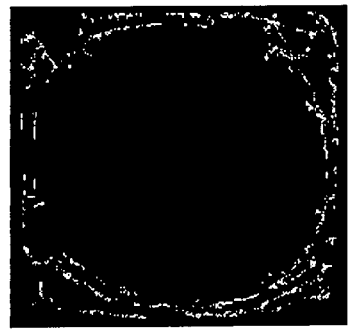
FIG.5B
EXAMPLE 2
IMAGE I     IMAGE II     IMAGE III
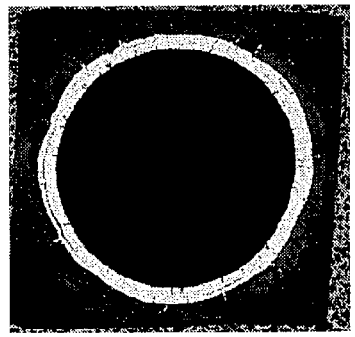 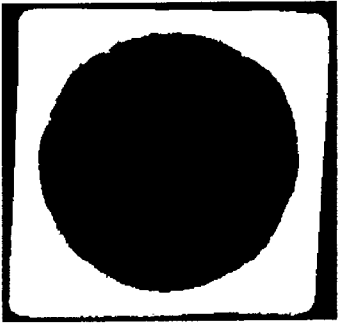 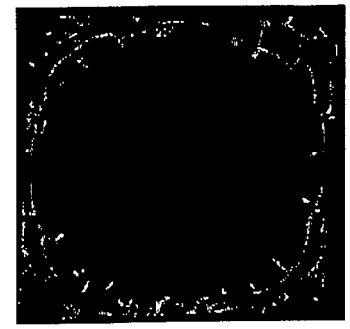

FIG.5C
EXAMPLE 5
IMAGE I    IMAGE II    IMAGE III
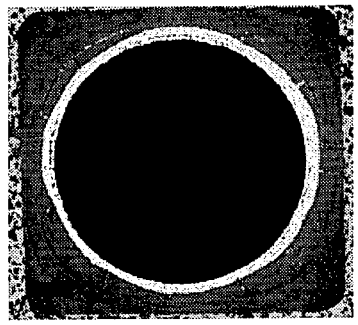 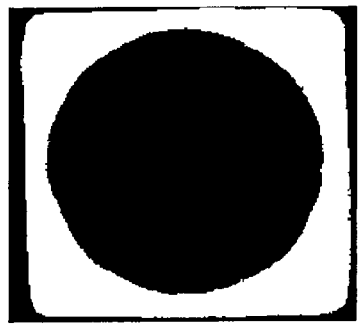 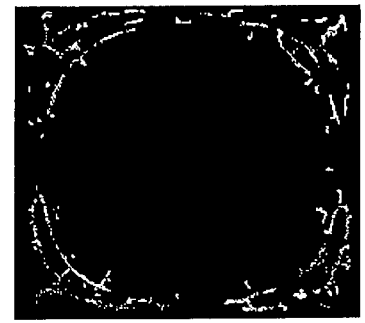
FIG.5D
EXAMPLE 11
IMAGE I    IMAGE II    IMAGE III
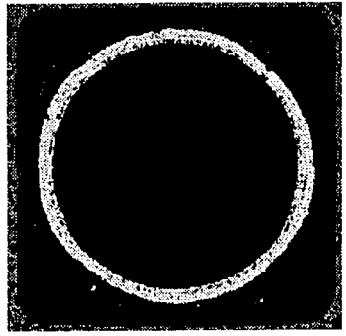 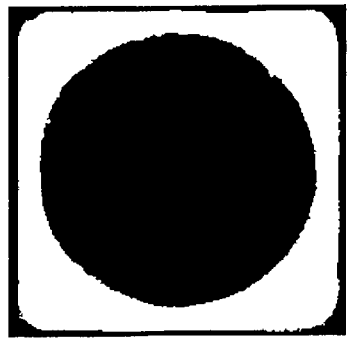 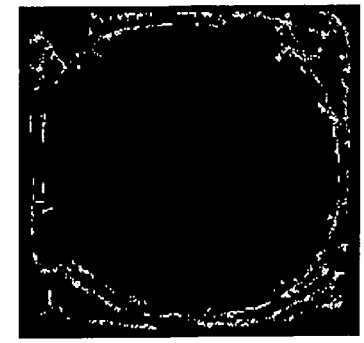

FIG.6

| | DRYING PROCESS CONDITION | | HC ADSORBENT LAYER | | | |
|---|---|---|---|---|---|---|
| | TEMPERATURE (°C) | GAS FLOW RATE (m/s) | WEIGHT OF COATED LAYER (g/L) | THICKNESS OF COATED LAYER AT SIDE (μm) | THICKNESS OF COATED LAYER AT CORNER (μm) | GAP RATIO (%) |
| EXAMPLE 1 | 30 | 5.0 | 350 | 120 | 310 | 4 |
| EXAMPLE 2 | 60 | 3.0 | 250 | 110 | 395 | 5 |
| EXAMPLE 3 | 60 | 6.0 | 350 | 122 | 305 | 6 |
| EXAMPLE 4 | 90 | 6.0 | 350 | 121 | 310 | 7 |
| EXAMPLE 5 | 60 | 5.0 | 350 | 120 | 310 | 8 |
| EXAMPLE 6 | 60 | 8.0 | 350 | 120 | 310 | 10 |
| EXAMPLE 7 | 60 | 5.0 | 350 | 120 | 310 | 8 |
| EXAMPLE 8 | 60 | 5.0 | 350 | 120 | 310 | 7 |
| EXAMPLE 9 | 60 | 5.0 | 400 | 135 | 360 | 6 |
| EXAMPLE 10 | 60 | 5.0 | 450 | 150 | 400 | 7 |
| EXAMPLE 11 | 130 | 10.0 | 350 | 120 | 310 | 12 |
| EXAMPLE 12 | 60 | 5.0 | 350 | 120 | 310 | 13 |
| EXAMPLE 13 | 60 | 5.0 | 350 | 120 | 310 | 11 |
| EXAMPLE 14 | 60 | 5.0 | 350 | 120 | 310 | 10 |
| EXAMPLE 15 | 60 | 5.0 | 350 | 120 | 310 | 15 |

FIG.8

| | HC ADSORPTION (%) | PURIFICATION RATE OF DESORBED HC (%) |
|---|---|---|
| EXAMPLE 1 | 80 | 42 |
| EXAMPLE 2 | 75 | 47 |
| EXAMPLE 3 | 80 | 40 |
| EXAMPLE 4 | 82 | 42 |
| EXAMPLE 5 | 80 | 43 |
| EXAMPLE 6 | 81 | 42 |
| EXAMPLE 7 | 80 | 44 |
| EXAMPLE 8 | 80 | 44 |
| EXAMPLE 9 | 82 | 46 |
| EXAMPLE 10 | 84 | 50 |
| EXAMPLE 11 | 72 | 31 |
| EXAMPLE 12 | 73 | 32 |
| EXAMPLE 13 | 74 | 30 |
| EXAMPLE 14 | 74 | 32 |
| EXAMPLE 15 | 73 | 31 |

FIG.9

| | PROPERTY OF ZEOLITE | | | | |
|---|---|---|---|---|---|
| | ANALYTICAL METHOD | NITROGEN CONTENT (%) | CARBON CONTENT (%) | WEIGHT REDUCTION BY TG ANALYSIS (%) | pH OF SLURRY |
| EXAMPLE 16 | TITRATION METHOD | 0.032 | 0.04 | 4.5 | 2.6 |
| EXAMPLE 17 | CHROMATOGRAPHY | 0.005 | 0.03 | 3.3 | 3.4 |
| EXAMPLE 18 | INFRARED ABSORPTION | 0.003 | 0.05 | 4.8 | 3.1 |
| COMPARATIVE EXAMPLE 1 | TITRATION METHOD | 0.127 | 0.04 | 7.3 | 5.6 |
| COMPARATIVE EXAMPLE 2 | TITRATION METHOD | 0.069 | 0.03 | 6.5 | 5.3 |

EXHAUST GAS PURIFYING CATALYST

BACKGROUND OF THE INVENTION

1. Field of the Invention

The present invention relates to an exhaust gas purifying catalyst, and more specifically, to an exhaust gas purifying catalyst that uses zeolite and is excellent in durability, and to a manufacturing method for the same.

2. Description of the Related Art

Exhaust gas purifying catalysts have been known, in which oxides of alumina, ceria and the like supporting noble metal thereon are coated on honeycomb substrates made of ceramics and metal. These exhaust gas purifying catalysts are described in Japanese Patent Laid-Open Publications S53-135898 (published in 1978), S63-88040 (published in 1988), H4-180840 (published in 1992), H5-285386 (published in 1993) and H6-47279 (published in 1994) and Japanese Patent Publication No. 2066821.

These catalysts are generally manufactured in the following manner as described in Japanese Patent Laid-Open Publication H5-285386. First, catalyst material powder of alumina, cerium or zirconium oxide on which noble metal is supported is milled and mixed with water by a ball mill or the like, and thus aqueous slurry is prepared. Then, the slurry is coated on a honeycomb substrate, and then dried and calcined, and thus catalyst-coated layers are formed on the surface of the honeycomb substrate.

Meanwhile, an HC-trap catalyst (three-way catalyst equipped with a HC-trap function) using zeolite for an HC adsorbent has been developed in recent years for the purpose of purifying hydrocarbons emitted in a large amount in a low-temperature range at the time of starting up an engine as an internal combustion engine (hereinafter, referred to as "cold HC").

Such a HC-trap catalyst as described above has functions of temporarily adsorbing and holding HC emitted in a large amount in the low-temperature range at the time of starting up an engine when the three-way catalyst is not still activated, and gradually desorbing and purifying the HC as the temperature of exhaust gas comes to be elevated to activate the three-way catalyst.

An HC-trap catalyst as shown in Japanese Patent Laid-Open Publication H2-56247 (published in 1990) has been proposed, which includes first layers mainly containing zeolite as an HC adsorbent, the first layers being formed on a honeycomb substrate, and second layers mainly containing noble metals such as Pt, Pd, Rh and the like, the second layers being provided on the first layers.

Moreover, the exhaust gas purifying catalysts, each using such an HC adsorbent as described above, are disclosed in Japanese Patent Laid-Open Publications H7-96177 (published in 1995), H9-38500 (published in 1997), H9-99217 (published in 1997).

Among these catalysts, from a viewpoint of enhancing a heat resistance of zeolite serving as an HC adsorbent, a HC-trap catalyst has been proposed in Japanese Patent Laid-Open Publication H7-96177, which uses an HC adsorbent obtained by carrying out acid treatment against unreformed zeolite and then treating the zeolite under the presence of moisture at a heat resistance temperature thereof or lower. Moreover, from viewpoints of maintaining a trap function of zeolite and controlling deterioration of purifying layers, there has been proposed in Japanese Patent Laid-Open H9-38500, that HC adsorbent layers are formed on a honeycomb substrate, and then, catalyst activation species made of a suitable amount of a noble metal compound and neodymium oxide is supported thereon. Subsequently, from a viewpoint of obtaining good HC-trap adsorbing/desorbing characteristics even if a high temperature of no less than 750° C. is applied, it has been proposed to use, as an HC adsorbent, β-zeolite having a mol ratio of $SiO_2$ to $Al_2O_3$ ($Si/_2Al$ ratio) to be 100 or more in Japanese Patent Laid-Open Publication H9-99217.

In the exhaust gas catalyst such as a HC-trap catalyst, which contains zeolite, in general, slurry obtained by mixing zeolite and an inorganic binder prepared, the obtained slurry is coated on a honeycomb substrate, and the concerned coated layers are dried and calcined, and thus catalyst layers containing zeolite are formed.

SUMMARY OF THE INVENTION

The exhaust gas purifying catalyst is dried and calcined in order to fix the catalyst slurry coated on the substrate. The coated layers greatly shrink since moisture evaporates from the slurry in this drying or calcining step. When the coated layers get thicker, the coated layers are unable to bear a tension generated therewithin, and cracks are apt to occur therewithin in the drying and/or calcining steps.

Moreover, the coated layers shrink more greatly in the case of using catalyst slurry that contains zeolite in which a water-retaining capacity is larger than that of active alumina or cerium oxide. Therefore, the coated layers containing zeolite are unable to bear the tension generated therewithin, and a large number of cracks are apt to occur in the catalyst layers in the drying or calcining step.

Furthermore, though it is desired to thicken the thickness of the HC adsorbent layers containing zeolite in order to enhance the HC-retaining capability of the HC-trap catalyst, cracks will occur in the coated layers in the drying or calcining step if the thickness of the HC adsorbent layers is thickened, causing a distortion of the coated layer and resulting in frequent exfoliation or falling-off of the coated layers.

Meanwhile, zeolite has a tendency in which an Al component becomes apt to go out, a skeleton is broken, and trap characteristics are deteriorated when the zeolite is exposed at a high temperature in a state of retaining moisture therein. Moisture is also contained in the exhaust gas. Therefore, in order to enhance the durability of the zeolite for use in the treatment catalyst for automotive exhaust gas, it is desirable to use zeolite having a high mol ratio of $SiO_2/Al_2O_3$ so that deterioration thereof hardly occur even under high-temperature conditions with moisture.

However, in the case of using zeolite having a high mol ratio of $SiO_2/Al_2O_3$, the affinity thereof with silica sol becomes inferior. Therefore, tendencies appear, in which the dispersiveness of the zeolite and silica sol in the slurry worsens, and silica sol is separated therefrom to emerge onto the slurry surface and to form a high-hydrophobic layer thereon. Accordingly, in the case of forming, on the HC adsorbent layers containing zeolite, catalyst layers containing a refractory inorganic oxide such as alumina relatively high in hydrophilicity, bonding force on an interface therebetween. becomes apt to be weakened. The HC adsorbent layers and the catalyst layers are relatively apt to be exfoliated from each other. When such a type of catalyst is exposed at a high temperature for a long time, the catalyst layers stacked on the HC adsorbent layers are exfoliated and fallen off, and the purifying function of the catalyst layers will be significantly lowered.

Moreover, as described above, in the case of using zeolite having a relatively high mol ratio of $SiO_2/Al_2O_3$ when the HC adsorbent layers are thickened in order to retain the trapped HC therein for a long time, even if the zeolite is coated in the form of water-based slurry on the honeycomb, the adhesiveness thereof to a binder becomes apt to be deteriorated due to the hydrophobicity and surface property of its own, resulting in frequent occurrence of cracks on the coated layers. Particularly, in a catalyst constructed to stack HC adsorbent layers and catalyst layers alternately, ingredients of the catalyst layers partially diffuse into the HC adsorbent layers, and therefore, it becomes impossible to secure a sufficient thickness of the catalyst layers for the purification.

It is an object of the present invention to provide an exhaust gas purifying catalyst, in which the exfoliation of the catalyst layers from the HC adsorbent layers and the falling-off of the HC adsorbent layers themselves due to cracks are prevented in the HC-trap type three-way catalyst using zeolite for the trap-material (HC adsorbent) to improve durability thereof, and to provide a manufacturing method for the same.

An exhaust gas purifying catalyst according to an aspect of the present invention includes a honeycomb substrate having a plurality of cells, and HC adsorbent layers mainly containing zeolite and having a thickness ranging from 100 µm to 500 µm, the HC adsorbent layers being formed on inner surfaces of the cells. These HC adsorbent layers have an approximately circular cross-sectional shape perpendicular to the direction where each cell is extended. Then, these HC adsorbent layers have first cracks extended in an approximately circumferential direction, and second cracks extended in an approximately radial direction. The first cracks and the second cracks are unconnected to each other or are connected in an extent not to cause layer exfoliation in the HC adsorbent layers.

Moreover, an exhaust gas purifying catalyst according to another aspect of the present invention includes a honeycomb substrate having a plurality of cells, and HC adsorbent layers containing zeolite and having a thickness ranging from 100 µm to 500 µm, the HC adsorbent layers being formed on inner surfaces of the cells. These HC adsorbent layers have an approximately circular cross-sectional shape perpendicular to the direction where each cell of the honeycomb substrate is extended. Then, this HC adsorbent layers have first cracks extended in an approximately circumferential direction, and second cracks extended in an approximately radial direction. The first cracks and the second cracks are unconnected to each other or are connected in an extent not to cause layer exfoliation in the HC adsorbent layers. The first cracks are extended discontinuously, or alternatively, the second cracks do not communicate from the surfaces of the HC adsorbent layers with the surface of the honeycomb substrate.

A manufacturing method according to another aspect of the present invention is a method for manufacturing the foregoing exhaust gas purifying catalyst of the present invention, which includes plural times of coating of slurry containing zeolite on a honeycomb substrate plural times to form HC adsorbent layers.

BRIEF DESCRIPTION OF THE DRAWINGS

FIG. 2 is an enlarged cross-sectional view of the cell, showing a structure of a HC adsorbent layer 10 of the exhaust gas purifying catalyst according to the first embodiment.

FIG. 3A is a view (image I) of a SEM picture of a cross section of the HC adsorbent layer according to the first embodiment, a view (image II) showing a coated layer of the SEM picture whitely by image processing, and a view (image III) showing cracks of the SEM picture whitely by image processing. FIG. 3B shows images I to III of another HC adsorbent layer according to the first embodiment. FIG. 3C shows images I to III of a HC adsorbent layer that is not included in the first embodiment.

FIG. 4A shows images I to III of the cross section of the HC adsorbent layer according to the first embodiment. FIG. 4B shows images I to III of the cross section of another HC adsorbent layer according to the first embodiment. FIG. 4C shows images I to III of the HC adsorbent layer that is not included in the first embodiment.

FIGS. 5A, 5B, 5C and 5D show images I to III of cross sections of catalysts of Examples 1, 2, 5 and 11, respectively.

FIG. 6 is a table showing manufacturing conditions of catalysts of Examples 1 to 15, manufacturing conditions of coated layers thereof, and gap ratios thereof caused by cracks.

FIG. 8 is a table showing HC trap ratios and HC purification ratios of Examples 1 to 15.

FIG. 9 is a table showing characteristics in zeolite used for respective catalysts of Examples 16 to 18 and Comparative examples 1 and 2.

FIG. 10A shows a catalyst B of Example 16; FIG. 10B shows a catalyst C of Example 17; FIG. 10C shows a catalyst D of Example 18; FIG. 10D shows a catalyst E of Comparative example 1; and FIG. 10E shows a catalyst F of Comparative example 2.

DESCRIPTION OF THE PREFERRED EMBODIMENTS

I. First Embodiment

The exhaust gas purifying catalyst of the present invention will be described below in detail. Note that a unit "%" represents a mass percentage unless otherwise specified in this specification.

Figure 1A:
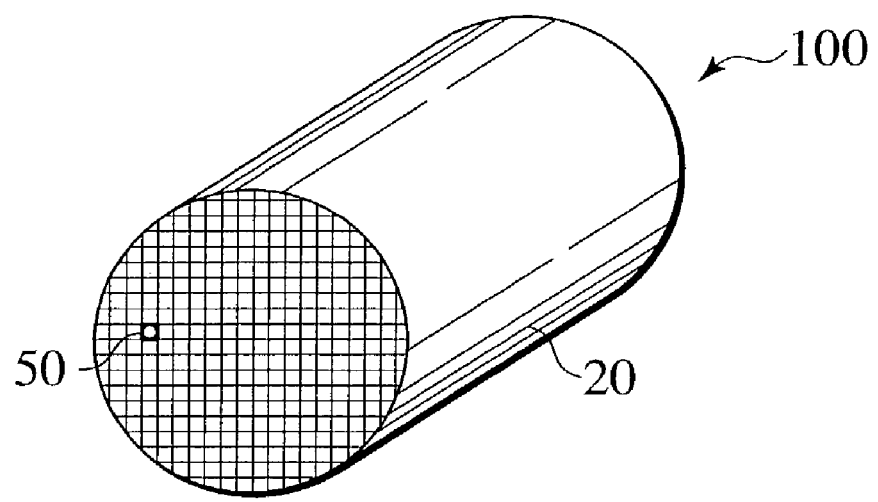
FIG. 1A is a perspective view of an exhaust gas purifying catalyst according to a first embodiment.
Figure 1B:
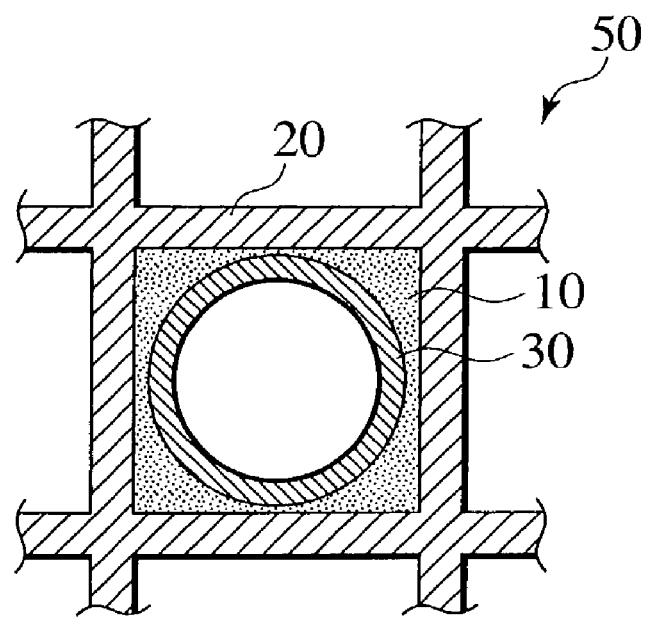
FIG. 1B is an enlarged cross-sectional view of a cell of the exhaust gas purifying catalyst according to the first embodiment.

The exhaust gas purifying catalyst 100 according to the first embodiment of the present invention is an exhaust gas purifying catalyst that includes HC adsorbent layers 10 containing zeolite on the honeycomb substrate 20 having the plurality of cells serving as exhaust gas passages as shown in FIGS. 1A and 1B. Note that the purifying catalyst layers 30 containing a noble metal catalyst may be formed on the HC adsorbent layers 10.

Here, it is satisfactory if the honeycomb substrate 20 may be a substrate of a type of monolithic structure. A substrate made of ceramics such as cordierite or a substrate made of metal such as ferrite-based stainless steel can be used.

No particular limitations are imposed on the cross-sectional shape of the cells 50. However, the cells 50 can be suitably used, which are regular polygonal, and particularly, approximately square as shown in FIG. 1B.

Moreover, the zeolite contained in the HC adsorbent layers 10 is not particularly limited. Various kinds of zeolite such as, for example, β-zeolite, mordenite, MFI, Y and USY can be cited. From a viewpoint of the thermal stability of a crystal structure, β-zeolite can be suitably used, which has a $SiO_2/Al_2O_3$ mol ratio ranging desirably from 20 to 1000, and more desirably, from 30 to 70.

FIG. 2 is an enlarged cross-sectional view of each of the cells. Illustration of the purifying catalyst layer 30 is omitted in this drawing. The HC adsorbent layer 10 of the exhaust gas purifying catalyst according to this embodiment has the approximately circular surface 10s as a cross section perpendicular to the direction where the cells of the honeycomb substrate 20 are extended (hereinafter, abbreviated as a "cell cross section"). Moreover, the HC adsorbent layer 10 has the circumferential-direction cracks (first cracks) CC1 to CC4 and the like extended in the approximately circumferential direction of the circular surface 10s and the radial-direction cracks (second cracks) RC1 to RC5 and the like extended in the approximately radial direction thereof. The circumferential-direction cracks and the radial-direction cracks are unconnected to each other or are connected in an extent not to cause layer exfoliation in the HC adsorbent layer 10.

Even if the circumferential and radial-direction cracks as described above exist in the exhaust gas purifying catalyst of the first embodiment, a state where the cracks are unconnected to each other is preferable in principle, for example, like the circumferential-direction crack CC2 and the radial-direction crack RC2.

However, if the cracks are connected to one another in the extent not to cause the layer exfoliation in the HC adsorbent layer 10, then such connection is allowed as in the cracks CC1 and RC1 and the cracks CC4 and RC4. Note that the possibility of causing the layer exfoliation is extremely low if the connection points of the circumferential-direction cracks and the radial-direction cracks are twenty or less in the illustrated quarter region of the cell cross section.

Moreover, in an exhaust gas purifying catalyst of another aspect according to the first embodiment, it is required that the circumferential-direction cracks (first cracks) should be extended discontinuously or that the radial-direction cracks (second cracks) should not communicate from the surface of the HC adsorbent layer with the surface of the honeycomb substrate.

Here, that "the circumferential-direction cracks are extended discontinuously" means that the circumferential-direction cracks are unconnected to one another and do not go round along with the approximately circular surface 10s of the HC adsorbent layer. For example, the cracks CC1, CC2, CC3 and the like are unconnected to one another and exhibit a state of broken lines in FIG. 2.

Meanwhile, that "the radial-direction cracks do not communicate from the surface of the HC adsorbent layer with the surface of the honeycomb substrate" means a form shown by the cracks RC1, RC2, RC4 and RC5 except for RC3 in FIG. 2.

Note that the crack RC2 does not reach the surface of the honeycomb substrate 20 though it reaches the HC adsorbent layer surface 10s. Moreover, the crack RC5 does not reach the HC adsorbent layer surface 10s though it reaches the surface of the honeycomb substrate 20. Therefore, no problem occurs. On the contrary to this, the crack RC3 communicating from the HC adsorbent layer surface 10s with the surface of the honeycomb substrate 20 should not exist within the HC adsorbent layer according to the first embodiment.

The HC adsorbent layer 10 according to the first embodiment has a thickness more than the conventional one, preferably ranging from 100 μm to 500 μm, in order to enhance the retaining capability for the trapped HC. If the thickness of the HC adsorbent layer 10 is less than 100 μm, then the trapped HC cannot accumulate sufficiently in the HC adsorbent layer. If the thickness thereof exceeds 500 μm, then an accumulation effect for the trapped HC in the HC adsorbent layer is saturated. If the HC adsorbent layer 10 according to the first embodiment is so thick as described above, then the layer exfoliation due to the cracks becomes apt to occur. Therefore, it is particularly important to provide the catalyst with such a structure as described above.

FIGS. 3A to 3C and FIGS. 4A to 4C show concrete examples of the structure of the HC adsorbent layer in terms of the cell cross section of the exhaust gas purifying catalyst provided therewith. Note that the shape of each cell cross section is approximately square in these pictures.

In FIGS. 3A to 3C and FIGS. 4A to 4C, the images I (left-side pictures) are SEM pictures of the HC adsorbent layers (coated layers). The images II (center pictures) are pictures obtained by performing image processing for the images I, showing the shapes (areas) of the entire coated layers. The coated layers are shown whitely in these images II. Furthermore, the images III (right-side pictures) are pictures obtained by performing image processing for the images I, showing the shapes of gaps (gap areas) originating from the cracks in the coated layers. The cracks are shown whitely in these images III.

Values of gap ratios due to the cracks are shown by the sides of the images III. These values of the gap ratios are values obtained by dividing the crack areas that are the white portions of the images III by the coated layer areas that are the white portions of the images II.

The exhaust gas purifying catalyst according to the first embodiment includes, as objects thereof, ones having the structures of the HC adsorbent layers, for example, which are shown in FIGS. 3A and 3B and FIGS. 4A and 4B.

On the other hand, in the structures shown in FIG. 3C or 4C, the connection points of the circumferential-direction cracks and the radial-direction cracks are too many, the circumferential cracks go round substantially, the radial-direction cracks penetrate between the surface of the HC adsorbent layer and the surface of the honeycomb substrate, and so on. Such structures are out of the objects of the exhaust gas purifying catalyst according to the first embodiment.

As introduced from the catalyst structures shown in FIGS. 3A to 3C and FIGS. 4A to 4C, the cross-sectional area of the gap portions defined by the circumferential-direction cracks and the radial-direction cracks should be 10% or less of the cross-sectional area of the entire HC adsorbent layer in the exhaust gas purifying catalyst of the first embodiment.

If the cross-sectional area of the gap portions exceeds 10% of the cross-sectional area of the entire HC adsorbent layer, then the forms of the cracks according to the first embodiment, which are as described above, come not to be satisfied, the layer exfoliation becomes apt to occur, and the durability deteriorates.

While the exhaust gas purifying catalyst of the first embodiment contains zeolite in the HC adsorbent layer, it is possible to allow the catalyst to contain other components than the zeolite. However, it is more preferable that the zeolite and noble metal as a catalyst component should not exist in the same layer in terms of the durability.

For example, alumina, silica-alumina and the like can be made to contain as porous base materials for use in supporting the catalyst component. Particularly, active alumina having a specific surface area ranging from 50 to 300 m²/g can be suitably used. Moreover, a rare earth element and zirconium may be added to the alumina for the purpose of enlarging the specific surface area thereof.

Note that, in order to allow the catalyst component to exert a three-way function, it is suitable to use platinum (Pt), palladium (Pd) or rhodium (Rh) and an arbitrary mixture thereof as the catalyst component.

Next, a manufacturing method for an exhaust gas purifying catalyst according to the first embodiment will be described.

The manufacturing method for the exhaust gas purifying catalyst according to the first embodiment is a method for manufacturing the above-described exhaust gas purifying catalyst of this embodiment, in which slurry containing zeolite is coated on a honeycomb substrate plural times, then dried, or dried and calcined, and thus HC adsorbent layers that satisfy the above-described conditions are formed.

This plural-time coating should include a crack-filling step of coating slurry for the purpose of filling cracks occurring in a relatively thick coated layer. Such crack-filling is carried out after coating the slurry containing zeolite on the honeycomb substrate, forming the coated layer, and drying the coated layer or drying and calcining the coated layer.

For example, first, the first slurry containing zeolite is coated, the obtained coated layer is dried, or dried and calcined, and thus the first coated layer having cracks is formed. Next, the second slurry containing zeolite is coated on the first coated layer, and the cracks that have occurred within the first coated layer are buried with the second slurry. The coated layer obtained with the second slurry is dried, or dried and calcined, and the second coated layer is formed. Thereafter, the forming of the first coated layer and the forming of the second coated layer are repeated at least one time. Note that the second coated layer should be made thinner than the first coated layer to an extent not to cause cracks.

In the manufacturing method according to the first embodiment, the treatment is carried out, in which the cracks that have occurred in the first coated layer are buried by coating the second slurry thereon. Therefore, the area of the gap portions due to the cracks can be reduced, and the connection points between the circumferential-direction cracks and the radial-direction cracks can be reduced, these cracks becoming start points of cracks that can possibly cause the layer exfoliation. If the crack-filling step as described above is carried out, then the occurrence of the cracks can be prevented effectively even if the thickness of the HC adsorbent layer ranges from 100 to 500 μm, and the above-described HC adsorbent layer according to this embodiment can be formed.

Note that, after the calcining, the thickness of the first coated layer should be set in a range from 10 to 100 μm and the thickness of the second coated layer should be set in a range from 1 to 20 μm.

The cracks occur in a large number particularly in highly hydrophobic zeolite, in which the hydrophobicity of the surfaces of zeolite particles and bonding force of a binder that bonds the zeolite particles together are greatly imbalanced. Therefore, the foregoing crack-filling is particularly effective in the case of using the zeolite having high hydrophobicity.

Here, the highly hydrophobic zeolite means zeolite with a property in which the zeolite precipitates and so on not to be dispersed uniformly at the time of being mixed with water and a binder (for example, a water-based binder such as silica sol) when the slurry to form the coated layer is prepared.

Note that the reason for repeating the formation of the first coated layer with the thickness of 10 to 100 μm and the formation of the second coated layer with the thickness of 1 to 20 μm is that the crack-filling can be realized efficiently. If the first coated layer deviates from the foregoing range of thickness, then the cracks will be enlarged, and the filling effect is not obtained sufficiently. If the second coated layer deviates from the foregoing range of thickness, then new cracks occur within the portions of the HC adsorbent layer, which have not been buried in the cracks, and therefore, the effect of the filling treatment comes not to be obtained sufficiently.

Moreover, the foregoing drying step, and particularly, the drying of the second coated layer for the crack-filling treatment is desirably carried out slowly. For example, it is preferable to perform the drying by flowing gas at a temperature of 20 to 90° C. into the cell at a gas flow rate ranging from 2 to 8 m/s.

Note that the crack-filling treatment may be performed with the second slurry after forming the thick first coated layer by the plural times of coating. It is not necessary that the thickness of the coated layer formed each time be equal to those of the others in the case of repeating the forming of the first coated layer and the forming of the second coated layer plural times.

In accordance with the manufacturing method for an exhaust gas purifying catalyst according to the first embodiment, a moisture removal rate and/or a reduction rate of a moisture amount in the HC adsorbent layer containing zeolite is adjusted. Thus, it is made possible to control the occurrence of a tension in the drying or calcining step, that is, the occurrence of a distortion of the coated layer, or alternatively, to control the magnitude of a tension, that is, the magnitude of the distortion. The area of the gap portions caused by the cracks can be lowered, the connection points of the circumferential-direction cracks and the radial-direction cracks, which become the start points of the cracks that can possibly cause the layer exfoliation, can be reduced, and so on. Therefore, it will be facilitated to obtain the HC adsorbent layer according to the first embodiment.

EXAMPLES

Example 1

Eight hundred g of β-zeolite powder having a $SiO_2/Al_2O_3$ mol ratio of 40, 1333.3 g of silica sol (solid concentration 15%) and 1000 g of pure water were poured into an alumina-made ball mill pot, then were milled for 60 minutes, and thus slurry was obtained.

This slurry was coated on a monolithic substrate (catalyst capacity 1.0 L) of 300 cells/6 mills (46.5 cells/cm², wall thickness 0.0152 cm), dried for 30 minutes under the flow of air of 30° C. at a gas flow rate of 5 m/s after removing extra slurry in the cells by an air flow. Subsequently, the slurry was dried for 15 minutes under the flow of air of 150° C., and then calcined at 400° C. for an hour, and thus a catalyst-a (first coated layer) was obtained. The weight of the catalyst-a after the calcining was 85 g/L. Note that the weight after the calcining was adjusted by the dilution rate of the slurry.

Next, in order to fill cracks that have occurred in the catalyst-a, the foregoing slurry for the amount of 25 g/L which corresponded to the weight after the calcining was coated on the catalyst-a, and dried for 30 minutes under the flow of air of 30° C. at a gas flow rate of 6 m/s after removing extra slurry in the cells by an air flow. Subsequently, the slurry was dried for 15 minutes under the flow of air of 150° C., and then calcined at 400° C. for an hour. Thus, the second coated layer was formed.

A similar coating process was repeated three times, and then slurry containing zeolite for the amount of 330 g/L as the weight after the calcining was coated, and thus a catalyst-b was obtained. Furthermore, in order to fill cracks that have occurred in the coated layer, the foregoing slurry for the amount of 20 g/L as the weight after the calcining was coated on the catalyst-b, and dried for 30 minutes under the flow of air of 30° C. at a gas flow rate of 5 mls after removing extra slurry in the cells by an air flow. Subsequently, the slurry was dried for 15 minutes under the flow of air of 150° C., and then calcined at 400° C. for an hour. Thus, a catalyst-c (HC adsorbent layer) containing 350 g/L of zeolite was obtained.

A catalyst component layer was formed on the HC adsorbent layer under the following conditions. First, alumina powder (Al 97 mol %) containing 3 mol % of Ce was impregnated with an aqueous palladium nitrate solution, or sprayed therewith while the alumina powder was stirred at a high speed. After the alumina powder was dried at 150° C. for 24 hours, the dried alumina powder was calcined at 400° C. for an hour, and then at 600° C. for an hour, and thus Pd supported alumina powder (powder-a) was obtained. Pd concentration of this powder-a was 4.0%.

Cerium oxide powder (Ce 67 mol %) containing 1 mol % of La and 32 mol % of Zr was impregnated with the aqueous palladium nitrate solution, or sprayed therewith while the cerium oxide powder was stirred at a high speed. After the cerium oxide powder was dried at 150° C. for 24 hours, the dried cerium powder was calcined at 400° C. for an hour, and then at 600° C. for an hour, and thus Pd supported cerium oxide powder (powder-b) was obtained. Pd concentration of this powder-b was 2.0%.

Next, 400 g of the Pd supported alumina powder (powder-a), 141 g of the Pd supported cerium oxide powder (powder-b), 240 g of nitrate acidic alumina sol (24 g, in $Al_2O_3$, of sol obtained by adding 10% of nitric acid to 10% of boehmite alumina), 100 g of barium carbonate (67 g of BaO) and 2000 g of pure water were poured into a magnetic ball mill, then were mixed and milled, and thus slurry was obtained. This slurry was coated on the catalyst-c (HC adsorbent layer), dried after removing extra slurry in the cells by an air flow, and calcined at 400° C. for an hour. Then, the slurry of a coated layer weight of 66.5 g/L was coated, and thus a catalyst-d was obtained.

Alumina powder (Al 97 mol %) containing 3 mol % of Zr was impregnated with an aqueous rhodium nitrate solution, or sprayed therewith while the alumina powder was stirred at a high speed. After the alumina powder was dried at 150° C. for 24 hours, the alumina powder was calcined at 400° C. for an hour, and then at 600° C. for an hour, and thus Rh supported alumina powder (powder-c) was obtained. Rh concentration of this powder-c was 2.0%.

Alumina powder (Al 97 mol %) containing 3 mol % of Ce was impregnated with an aqueous platinum dinitrodiamine solution, or sprayed therewith while the alumina powder was stirred at a high speed. After the alumina powder was dried at 150° C. for 24 hours, the alumina powder was calcined at 400° C. for an hour, and then at 600° C. for an hour, and thus Pt supported alumina powder (powder-d) was obtained. Pt concentration of this powder d was 3.0%.

Zirconium oxide powder containing 1 mol % of La and 20 mol % of Ce was impregnated with an aqueous platinum dinitrodiamine solution, or sprayed therewith while the zirconium oxide powder was stirred at a high speed. After the zirconium powder was dried at 150° C. for 24 hours, the zirconium oxide powder was calcined at 400° C. for an hour, and then at 600° C. for an hour, and thus Pt supported alumina powder (powder-e) was obtained. Pt concentration of this powder-e was 3.0%.

Next, 118 g of the Rh supported alumina powder (powder-c), 118 g of the Pt supported alumina powder (powder-d), 118 g of the Pt supported zirconium oxide powder (powder-e) and 160 g of nitrate acidic alumina sol were poured into a magnetic ball mill, and then were mixed and milled, and thus slurry was obtained. This slurry was coated on the forgoing coated catalyst-d, dried after removing extra slurry in the cells by an air flow, and calcined at 400° C. for an hour. Then, the slurry of a coated layer weight of 37 g/L was coated, and thus a catalyst of Example 1 was obtained. The noble metal supported amounts of the catalyst thus obtained were 0.71 g/L for Pt, 1.88 g/L for Pd, and 0.24 g/L for Rh.

FIG. 5A shows the structure of the coated layer on the cell cross section of the catalyst of Example 1. The reference numeral 501A denotes the image I that is a SEM picture of the coated layer. The numeral 501B denotes the image II showing the coated layer portion whitely by performing image processing for the image I. The numeral 501C denotes the image III only showing the cracks that have occurred in the coated layer by performing image processing for the image I. A gap ratio obtained from the images II and III, that is, a value obtained by dividing the gap area of the crack portions by the area of the entire coated layer was 4%.

Example 2

First, 800 g of β-zeolite powder having a $SiO_2/Al_2O_3$ mol ratio of 50, 1333.3 g of silica sol (solid concentration 15%) and 1000 g of pure water were poured into an alumina-made ball mill pot, then were milled for 60 minutes, and thus slurry was obtained. This slurry was coated on a monolithic substrate (catalyst capacity 1.0 L) of 200 cells/10 mills (31.0 cells/$cm^2$, wall thickness 0.0254 cm), dried for 30 minutes under the flow of air of 60° C. at a gas flow rate of 3 m/s after removing extra slurry in the cells by an air flow. Subsequently, the slurry was dried for 15 minutes under the flow of air of 150° C., and then calcined at 400° C. for an hour. Thus, a catalyst-e (first coated layer) having the weight after the calcining of 80 g/L was obtained.

Next, in order to fill cracks that have occurred in the catalyst-e, the foregoing slurry for the amount of 20 g/L as the weight after the calcining was coated on the catalyst-e, and dried for 30 minutes under the flow of air of 60° C. at a gas flow rate of 3 m/s after removing extra slurry in the cells by an air flow. Subsequently, the slurry was dried for 15 minutes under the flow of air of 150° C., and then calcined at 400° C. for an hour. Thus, the second coated layer was formed.

A similar coating operation was repeated twice, and thus a catalyst-f containing zeolite for the amount of 200 g/L as the weight after the calcining was obtained. Furthermore, in order to fill cracks that have occurred, the foregoing slurry for the amount of 50 g/L as the weight after the calcining was coated on the catalyst-f, and dried for 30 minutes under the flow of air of 60° C. at a gas flow rate of 3 m/s after removing extra slurry in the cells by an air flow. Subsequently, the catalyst-f was dried for 15 minutes under the flow of air of 150° C., and then calcined at 400° C. for an hour. Thus, a catalyst-g (HC adsorbent layer) of 250 g/L was obtained.

Next, a catalyst component layer was formed on the catalyst-g under the similar conditions to those for Example 1, and thus a catalyst of Example 2 was obtained. The noble metal supported amounts of the catalyst thus obtained were 0.71 g/L for Pt, 1.88 g/L for Pd, and 0.24 g/L for Rh.

FIG. 5B shows the images I to III of the cell cross section of the catalyst of Example 2. A gap ratio obtained from the images II and III, that is, a value obtained by dividing the gap area of the crack portions by the area of the entire coated layer was 5%.

Example 3

The drying temperature and the gas flow rate for the first and second coated layers were set at 60° C. and 6 m/s, respectively. Other than these, similar conditions to those for Example 1 were used, and a catalyst 2 of Example 3 was obtained.

Example 4

The drying temperature and the gas flow rate for the first and second coated layers were set at 90° C. and 6 m/s, respectively. Other than these, similar conditions to those for Example 1 were used, and a catalyst of Example 4 was obtained.

Example 5

The drying temperature and the gas flow rate for the first and second coated layers were set at 60° C. and 5 m/s, respectively. Other than these, similar conditions to those for Example 1 were used, and a catalyst of Example 5 was obtained.

FIG. 5C shows the images I to III of the cell cross section of the catalyst of Example 5. A gap ratio obtained from the images II and III, that is, a value obtained by dividing the gap area of the crack portions by the area of the entire coated layer was 8%.

Example 6

The drying temperature and the gas flow rate for the first and second coated layers were set at 60° C. and 8 m/s, respectively. Other than these, similar conditions to those for Example 1 were used, and a catalyst of Example 6 was obtained.

Example 7

First, 800 g of β-zeolite powder having a $SiO_2/Al_2O_3$ mol ratio of 40, 1333.3 g of silica sol (solid concentration 15%) and 1000 g of pure water were poured into an alumina-made ball mill pot, then were milled for 60 minutes, and thus slurry was obtained. This slurry was coated on a monolithic substrate (catalyst capacity 1.0 L) of 300 cells/6 mills (46.5 cells/cm$^2$, wall thickness 0.0152 cm), dried for 30 minutes under the flow of air of 30° C. at a gas flow rate of 5 m/s after removing extra slurry in the cells by an air flow. Subsequently, the slurry was dried for 15 minutes under the flow of air of 150° C., and then calcined at 400° C. for an hour. Thus, a catalyst-a (first coated layer) having weight after the calcining of 85 g/L was obtained.

Next, similar operations were performed for the catalyst-a, and further, the solid concentration of the slurry and the charge amount thereof were adjusted so that the weight thereof after the calcining could be 85 g/L, and thus a catalyst-h was obtained.

In order to fill cracks that have occurred in the catalyst-h, the foregoing slurry for the amount of 30 g/L as the weight after the calcining was coated on the catalyst-h, and dried for 30 minutes under the flow of air of 30° C. at a gas flow rate of 6 m/s after removing extra slurry in the cells by an air flow. Subsequently, the slurry was dried for 15 minutes under the flow of air of 150° C., and then calcined at 400° C. for an hour. Thus, a catalyst-i was formed.

The slurry was further coated on the catalyst-i so that the weight thereof after the calcining could be 75 g/L, and a catalyst-i was obtained. Similar operations were repeated for the catalyst-j one more time, and the solid concentration of the slurry and the charge amount thereof were adjusted so that the weight thereof after the calcining could be 75 g/L, and thus a catalyst-k was obtained. In such a manner, a catalyst of Example 7 was obtained, on which 350 g/L of the HC adsorbent layer containing zeolite was formed.

Example 8

First, 800 g of β-zeolite powder having a $SiO_2/Al_2O_3$ mol ratio of 40, 1333.3 g of silica sol (solid concentration 15%) and 1000 g of pure water were poured into an alumina-made ball mill pot, then were milled for 60 minutes, and thus slurry was obtained. This slurry was coated on a monolithic substrate (catalyst capacity 1.0 L) of 300 cells/6 mills (46.5 cells/cm$^2$, wall thickness 0.0152 cm), dried for 30 minutes under the flow of air of 30° C. at a gas flow rate of 5 m/s after removing extra slurry in the cells by an air flow. Subsequently, the slurry was dried for 15 minutes under the flow of air of 150° C., and then calcined at 400° C. for an hour. Thus, a catalyst-a (first coated layer) having weight after the calcining of 80 g/L was obtained. Subsequently, similar operations were performed for the catalyst-a, and further, the similar operations were repeated three times. Thus, a catalyst-m was obtained.

Next, in order to fill cracks that have occurred therein, the foregoing slurry for the amount of 30 g/L as the weight after the calcining was coated on the catalyst-m, and dried for 30 minutes under the flow of air of 30° C. at a gas flow rate of 6 m/s after removing extra slurry in the cells by an air flow. Subsequently, the slurry was dried for 15 minutes under the flow of air of 150° C., and then calcined at 400° C. for an hour. Thus, a catalyst-n was obtained. In such a manner, a catalyst of Example 8, which was provided with 350 g/L of the HC adsorbent layer containing zeolite, was obtained.

Example 9

Similar operations to those for Example 1 were repeated, and a catalyst of Example 9, which was provided with 400 g/L of the HC adsorbent layer containing zeolite, was obtained.

Example 10

Similar operations to those for Example 1 were repeated, and a catalyst of Example 10, which was provided with 450 g/L of the HC adsorbent layer containing zeolite, was obtained.

Example 11

The drying temperature and the gas flow rate for the coated layer were set at 130° C. and 10 m/s, respectively. Other than these, similar operations to those for Example 1 were used, and a catalyst of Example 11 was obtained.

FIG. 5D shows the images I to III of the cell cross section of the catalyst of Example 11. A gap ratio obtained from the images II and III was 12%.

Example 12

Each coating amount was increased, and the amount of the HC adsorbent layer containing zeolite was set at 350 g/L by the operations performed three times. Other than these, similar operations to those for Example 1 were repeated, and a catalyst of Example 12 was obtained.

Example 13

The coating operations in Example 1 were inverted. Other than this, similar operations to those for Example 1 were repeated, and thus a catalyst of Example 13 was obtained.

Example 14

Filling-cracks treatment was not carried out. Other than this, similar operations to those for Example 1 were repeated, and a catalyst of Example 14 was obtained.

Example 15

The drying temperature and the gas flow rate for the coated layer were set at 130° C. and 10 m/s, respectively. Further, each coating amount was increased, and the amount of the coated layer containing zeolite was set at 350 g/L by the operations performed three times. Other than these, similar operations to those for Example 1 were repeated, and a catalyst of Example 15 was obtained.

The drying temperatures, the gas flow rates, the coated layer weights, the gap ratios and the like in the catalysts of the above-described Examples are shown in the table of FIG. 6.

[Performance Evaluation]

Figure 7:
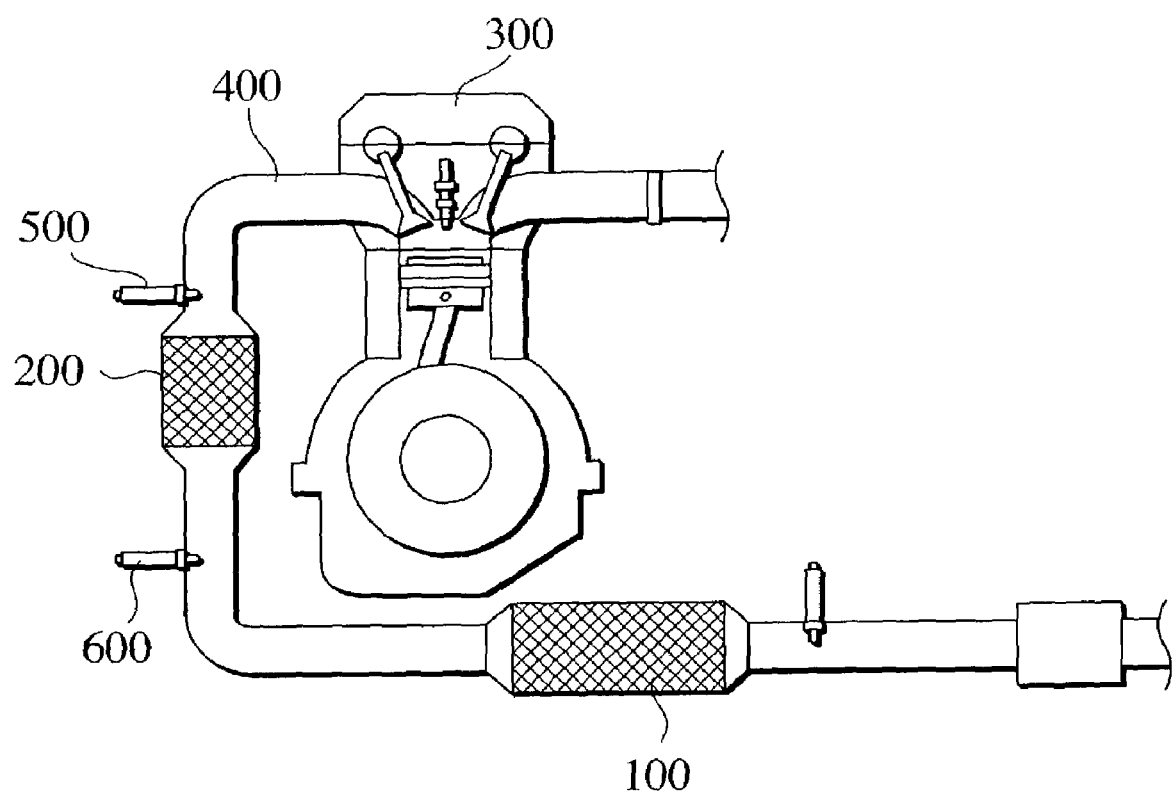
FIG. 7 is a diagram illustrating a configuration of an exhaust gas purifying system used for measuring performances of the catalysts of Examples 1 to 15.
Figure 10A:
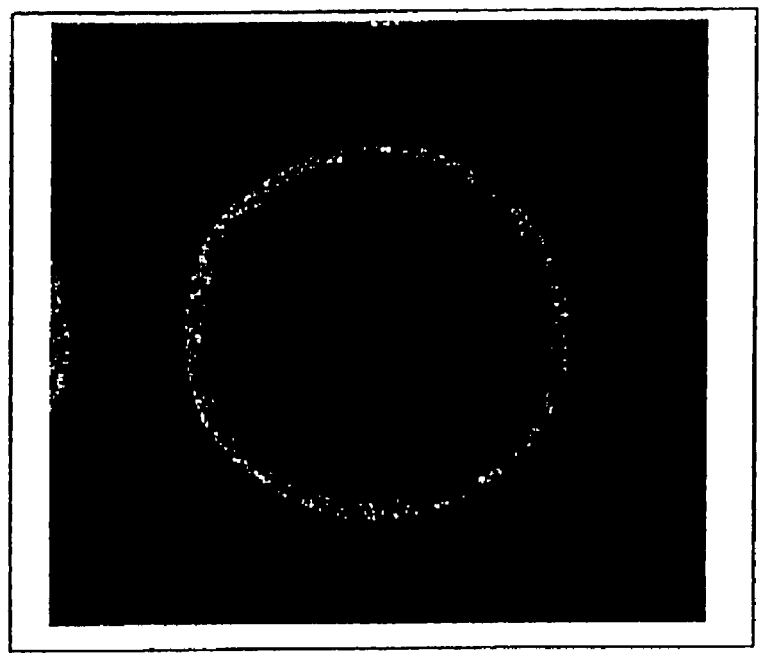
FIGS. 10A to 10E are SEM images showing respective states of cross sections of catalysts after durability tests.
Figure 10B:
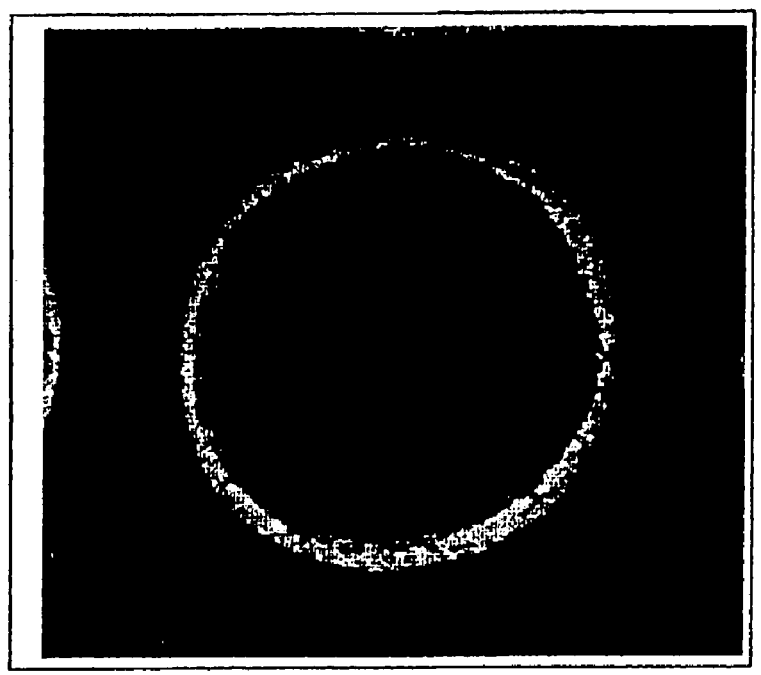
Figure 10C:
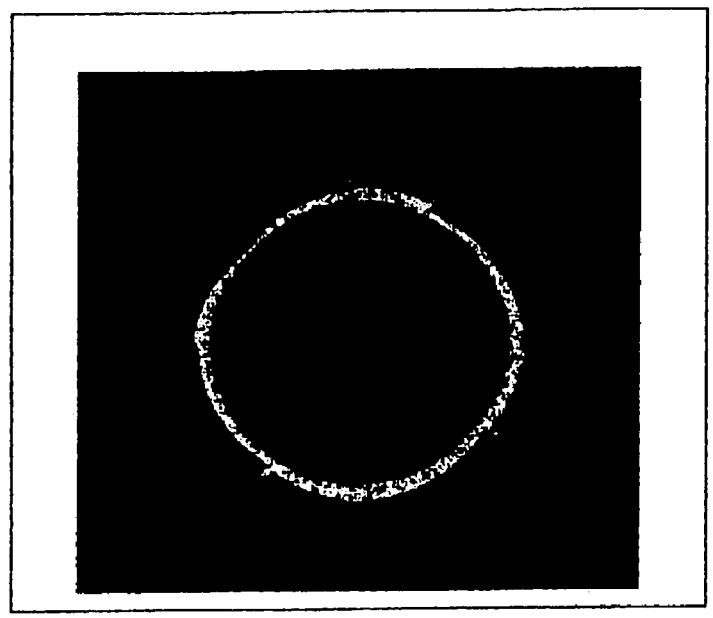
Figure 10D:
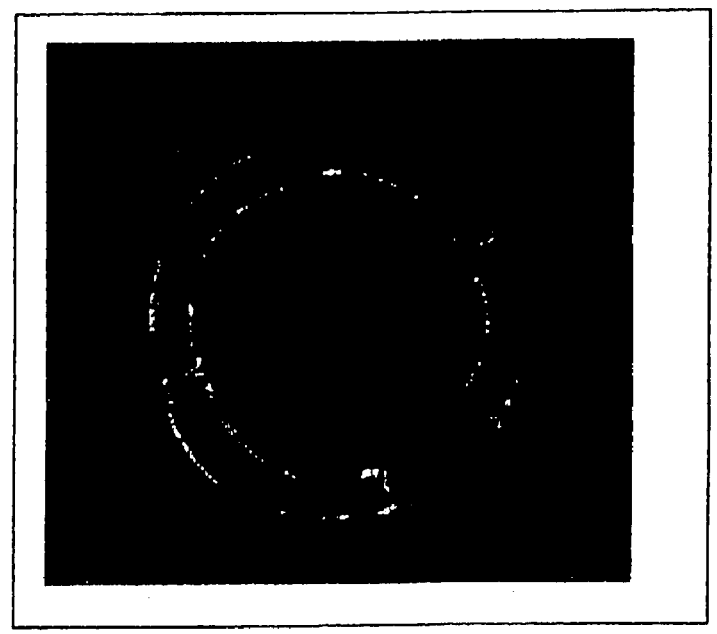
Figure 10E:

Each of the catalyst of Examples 1 to 15 was used as the catalyst 100 of the automotive exhaust gas purifying system shown in FIG. 7, and the HC trap rate and HC purification efficiency thereof were measured. In this purifying system, the three-way catalyst 200 was arranged upstream in the passage 400 for exhaust gas emitted from the engine 300, and the catalyst 100 of each Example was arranged downstream therein. Note that the air/fuel ratio sensor 500 and the oxygen sensor 600 were provided in the exhaust gas passage 400. The obtained results are shown in the table of FIG. 8.

From the table of FIG. 8, it can be said that, at present, Examples 1, 8, 9 and 10 are suitable and Example 8 is optimal from a viewpoint of managing both the durability and the productivity.

(The Conditions of Durability Tests)

| Engine displacement | 3000 cc |
|---|---|
| Fuel | gasoline (Nisseki Dash) |
| Gas temperature at the catalyst inlet | 650° C. |
| Time of durability | 100 hours |

(Vehicle Performance Test)

| Engine displacement | In-line four-cylinder 2.0 L engine made by Nissan Motor Co., Ltd. |
|---|---|
| (Method of evaluation) | A-bag of LA4-CH of North America exhaust gas testing method |

As described above, with regard to the catalyst according to the first embodiment, the form of the occurring cracks is controlled appropriately, and a predetermined crack-filling treatment is carried out. Therefore, when the catalyst layer (HC adsorbent layer) containing zeolite is formed on the surface of the substrate such as a ceramic monolithic substrate and a metal-made honeycomb substrate, the occurrence of the cracks causing the exfoliation of the catalyst layer can be prevented. Thus, it is made possible to provide an exhaust gas purifying catalyst in which durability is improved to a great extent and to provide a manufacturing method for the same.

Specifically, the cracks of the zeolite coated layer in the circumferential direction and/or the radial direction, which can possibly cause the exfoliation of the catalyst layer, are controlled appropriately by making such cracks discontinuous and so on. Thus, the durability of the zeolite coated layer can be improved, the exfoliation of the zeolite coated layer can be prevented even after a long-time use, and excellent durability can be realized.

II. Second Embodiment

An exhaust gas purifying catalyst according to the second embodiment also includes the HC adsorbent layer 10 containing zeolite, which is shown in FIGS. 1A, 1B and 2, similarly to the exhaust gas purifying catalyst according to the first embodiment.

The exhaust gas purifying catalyst according to the second embodiment will be described below. The HC adsorbent layer according to the second embodiment is characterized by using zeolite in which a nitrogen content is 0.05% or less. Note that a unit "%" represents a mass percentage. The transformation/deterioration of the binder is small since the nitrogen content of zeolite is controlled, and the HC adsorbent layer is coated on, for example, a honeycomb substrate while maintaining the bonding force between the zeolite and the binder preferable. Therefore, the substrate and the zeolite particles are strongly fixed together, and the breakage and the exfoliation of the HC adsorbent layer are controlled even after the catalyst is used for a long time at a high temperature. Furthermore, the exfoliation of the purifying catalyst layer stacked on the HC adsorbent layer is prevented, and the catalyst performance is maintained for a long term.

It is preferable for the HC adsorbent layer 10 according to the second embodiment to use zeolite powder having a carbon content of 0.05% or less as well as the zeolite having a nitrogen content of 0.05% or less. Calcining after coating the slurry and so on will make it hard for unnecessary products ($CO$, $CO_2$ and the like) originating from C contained in the zeolite to interpose between the zeolite powder and the binder. Therefore, the HC adsorbent layer is held on the substrate in a state where the bonding force between the zeolite and the binder is maintained well. The fixed state of the substrate and the zeolite particles becomes strengthened, and the breakage and the exfoliation of the zeolite layer are controlled even after the catalyst is used for a long time at a high temperature.

Moreover, the HC adsorbent layer according to the second embodiment uses zeolite powder in which a weight reduction amount after removing contained moisture is 5% or less, the amount being measured by the thermogravimetric (TG) analysis/measurement. Therefore, the fixing between the honeycomb substrate and the zeolite particles becomes strengthened, and the breakage and the exfoliation of the zeolite layer are controlled even after the catalyst is used for a long time at a high temperature.

Specifically, the reduction of the contents of nitrogen and carbon and of the weight reduction measured by the TG analysis leads to the reduction of impurities existing on the surface of the zeolite. Thus, a state can be created, where the binder (silica sol is preferably used therefor) closely interacts with the zeolite surface, and a good coated state is achieved when the closely interacting binder and zeolite are calcined. On the contrary, the interposition of the impurities will lead to interposition of inhibitors between the binder and the zeolite, and the interaction between the binder component and the zeolite surface will be weakened (slight gaps will occur) by the calcining, resulting in the breakage and the exfoliation.

The nitrogen contained in the zeolite is inevitably mixed into the zeolite in the process of synthesizing the zeolite. Concretely, Na contained in a template (zeolite mold) material to be used in the case of synthesizing the zeolite is treated with ammonia to form an $NH_4$ (ammonium) type. When this $NH_4$ type is calcined to form an H (proton) type, $NH_4$ ions partially remain in the zeolite. The nitrogen in the zeolite originates from these $NH_4$ ions. Moreover, the carbons also originate from organic compounds in the template material.

In order to form the HC adsorbent layer, aqueous slurry containing the zeolite and the binder such as silica sol is prepared and coated on the honeycomb substrate. If the nitrogen concentration in the zeolite is high, then the pH value of the slurry contained in the zeolite is high since the $NH_4$ ion concentration thereof is high.

If the pH value of this slurry exceeds 5.0, then the pH value comes out of the stabilization range of the binder component, the binder condenses to lower its function as a binder rapidly. Therefore, the cracks and exfoliation of the HC adsorbent layer will be apt to occur. Therefore, it is desirable to set the pH of the aqueous slurry at 5 or less, and preferably, in a range from 2.0 to 4.0.

As described above, the nitrogen is a residual of a very small amount of ammonia for use in manufacturing the zeolite, and therefore the nitrogen content of the zeolite and the pH value of the slurry closely relate each other. Accordingly, when the nitrogen content of the zeolite is set at 0.05% or less, the pH of the slurry can be set at 5 or less.

Note that, in order to set the pH of the slurry at 5 or less, and preferably, in the range from 2.0 to 4.0, concretely, it is desirable to use zeolite powder having low nitrogen concentration such that pH of a liquid obtained by dispersing and suspending 10 g of zeolite powder into 100 cc of water becomes 5.0 or less, and preferably, a range from 2.0 to 4.0. If the slurry is prepared by mixing the zeolite powder as described above and silica sol as a binder, then the slurry having pH of 5.0 or less, and preferably, 2.0 to 4.0.

If the pH of the slurry is within the above-described range, then the silica sol can be stabilized, and an affinity between the zeolite and the binder can be maintained high. Therefore, the zeolite and the binder can be coated on the honeycomb substrate while maintaining the bonding force thereof well. Accordingly, since the honeycomb substrate and the zeolite particles are strongly fixed together, the breakage and exfoliation of the HC adsorbent layer containing zeolite are controlled even after a long-time use thereof at a high temperature.

The nitrogen content of the zeolite powder for use in the exhaust gas purifying catalyst according to the second embodiment was determined by any of the following methods: 1) a method, in which the zeolite powder is treated by predetermined amounts of an acid and a base in this order, and then ammonium ions extracted by distilling the zeolite powder are titrated (titration method); 2) a method, in which the zeolite powder is treated by pure water or a solution including predetermined quantity of an acid, and then an eluted nitrogen-containing component is determined by chromatography (method using chromatograph); and 3) a method, in which an infrared absorption spectrum of $-NH_4$ is detected by use of an infrared spectrometer (infrared absorption method). The nitrogen content of the zeolite powder will be quantitated accurately by use of these analytical methods. Thus, the above-described operation and effect based on the reduction of the nitrogen content of the zeolite will be more secured.

When a purifying catalyst layer containing a three-way catalyst is formed on the HC adsorbent layer containing the zeolite as described above, the cracks and exfoliation of the HC adsorbent layer and the exfoliation of the purifying catalyst layer from the HC adsorbent layer are prevented. Consequently, good purifying capacity will be exerted even after a long-time endurance at a high temperature.

EXAMPLES

Example 16

β-zeolite having a $SiO_2/Al_2O_3$ mol ratio of 40 was prepared, and various characteristics thereof were measured. First, the nitrogen content of the β-zeolite powder was 0.032% as a result of analysis in accordance with the distillation to isolate ammonia followed by amidosulfuric acid titration, which is the nitrogen determination method prescribed by JIS G1228. Moreover, as a result of analyzing carbon in the β-zeolite powder, the carbon content thereof was 0.04%. Furthermore, moisture absorbed within the above-described β-zeolite powder was removed at 200° C., and then a thermogravimetric analysis (using TG-DTA320 made by Seiko Instruments Inc.) was conducted for the powder. As a result of this, the mass change thereof in a temperature range from 200° C. to 1000° C. was 4.5%. Moreover, pH of a liquid obtained by dispersing and suspending 10 g of the β-zeolite powder into 100 cc of pure water, which was measured by a pH meter made by Horiba Techno-Service, Ltd. (model F-23C: glass electrode method), was 2.6.

Next, 800 g of the β-zeolite powder having the foregoing characteristics, 1333.3 g (solid part 15 wt %) of silica sol (ST-OUP made by Nissan Chemical Industries, Ltd.) having the form of chain-like particles with a mean particle diameter from 40 nm to 100 nm (0.04 μm to 0.1 μm) and 1000 g of pure water were poured into an alumina-made ball mill pot, then were milled for 60 minutes, and thus slurry was obtained. The mean particle diameter in this case was 1 μm to 2.2 μm. This slurry was coated on a cordierite-made monolithic substrate (catalyst capacity 1.0 L) of 300 cells/6 mills (46.5 cells/cm², wall thickness 0.0152 cm), dried for 30 minutes under the flow of air of 50° C. after removing extra slurry in the cells by an air flow. Subsequently, the slurry was dried for 15 minutes under the flow of air of 150° C., and then calcined at 400° C. for an hour. After the calcining, the coating was repeated plural times until the amount thereof reached 300 g/L, and thus a catalyst-A (HC adsorbent layer) was obtained.

Next, a catalyst component layer was formed on the HC adsorbent layer in the following procedure. First, alumina powder (Al 97 mol %) containing 3 mol % of Ce was impregnated with an aqueous palladium nitrate solution, or sprayed therewith while the alumina powder was stirred at a high speed. After the alumina powder was dried at 150° C. for 24 hours, the dried alumina powder was calcined at 400° C. for an hour, and then at 600° C. for an hour, and thus Pd supported alumina powder (powder-a) was obtained. Pd concentration of this powder-a was 4.0 weight %.

Cerium oxide powder (Ce 67 mol %) containing 1 mol % of La and 32 mol % of Zr was impregnated with an aqueous palladium nitrate solution, or sprayed therewith while the cerium oxide powder was stirred at a high speed. After the cerium oxide powder was dried at 150° C. for 24 hours, the dried cerium powder was calcined at 400° C. for an hour, and then at 600° C. for an hour, and thus Pd supported cerium oxide powder (powder-b) was obtained. Pd concentration of this powder-b was 2.0 weight %.

Next, 400 g of the Pd supported alumina powder (powder-a), 141 g of the Pd supported cerium oxide powder (powder-b), 240 g of nitrate acidic alumina sol (containing 24 g, in Al₂O₃, of sol obtained by adding 10 weight % of nitric acid to 10 weight % of boehmite alumina), 100 g of barium carbonate (67 g of BaO) and 2000 g of pure water were poured into a magnetic ball mill, then were mixed and milled, and thus slurry was obtained. The mean particle diameter in this case was 2 µm to 4 µm. This slurry was coated on the above-described HC adsorbent layer (catalyst-A), dried after removing extra slurry in the cells by an air flow, and calcined at 400° C. for an hour. Thus, an exhaust gas purifying catalyst-B with coated layer weight of 70.0 g/L was obtained. The noble-metal supported amount of the catalyst-B was 2.0 g/L for Pd.

Example 17

β-zeolite having a SiO₂/Al₂O₃ mol ratio of 40 was prepared, which was manufactured in another lot than that of the zeolite used in the above-described Example 16. A solution obtained by dispersing this β-zeolite into a 1N basic solution and filtering the powder component thereof was analyzed by means of an ion chromatograph (HIC-VP manufactured by Shimadzu Corporation). As a result, the nitrogen content of the powder was 0.005%. Moreover, as a result of carbon analysis of the β-zeolite powder, the carbon content thereof was 0.03%. Furthermore, moisture absorbed within the above-described β-zeolite powder was removed at 200° C., and a thermogravimetric analysis was performed therefor. As a result, the weight change thereof in a temperature range from 200° C. to 1000° C. was 3.3%. Moreover, pH of a liquid obtained by dispersing and suspending 10 g of the β-zeolite powder into 100 cc of pure water was 3.4.

Coating was carried out for the honeycomb substrate by use of the above-described β-zeolite powder in accordance with a method similar to that of Example 16, and the HC adsorbent layer (catalyst-A) and the catalyst component layer were formed, and thus an exhaust gas purifying catalyst-C was obtained.

Example 18

β-zeolite having a SiO₂/Al₂O₃ mol ratio of 40 was prepared, which was manufactured in another lot than those of the zeolite used in the above-described Examples 16 and 17. This β-zeolite was determined by analyzing an absorption spectrum in the vicinity of 1500 cm⁻¹ to 1650 cm⁻ as an absorption range for trapped ammonium ions by use of a diffuse reflection type infrared spectrophotometer (1720X manufactured by PerkinElmer, Inc.). As a result, the nitrogen content of the β-zeolite powder was 0.003%. Moreover, it was found out that the carbon content of the β-zeolite powder was 0.05% as a result of a similar analysis. Furthermore, when a thermogravimetric analysis was performed for the β-zeolite powder after removing moisture absorbed therein at 200° C., the weight change thereof in a temperature range from 200° C. to 1000° C. was 4.8%. Moreover, pH of a liquid obtained by dispersing and suspending 10 g of the β-zeolite powder into 100 cc of pure water was 3.1.

A HC-trap/purifying catalyst was prepared by use of the β-zeolite powder as described above in accordance with a method similar to that of Example 16, and then a purifying catalyst layer was further formed by the similar method, and thus an exhaust gas purifying catalyst-D was obtained.

Comparative Example 1

β-zeolite having a SiO₂/Al₂O₃ mol ratio of 40 was used, which was manufactured in yet another lot than those of the zeolite used in Examples 16 to 18. The nitrogen content of the β-zeolite powder was analyzed in accordance with the distillation to isolate ammonia followed by amidosulfuric acid titration, which is prescribed in JIS G1228, similar to the above-described Example 16. As a result, the content was 0.127%. Moreover, the carbon content was 0.04%, and the mass change thereof in a temperature range from 200° C. to 1000° C., which was obtained by the thermogravimetric analysis (TG), was 7.3%. Moreover, pH of a liquid obtained by dispersing and suspending 10 g of the β-zeolite powder into 100 cc of pure water was 5.6.

An HC adsorbent layer was formed by use of the β-zeolite powder as described above in accordance with a method similar to that of Example 16, and then a catalyst component layer containing noble metal was further formed by the similar method, and thus an exhaust gas purifying catalyst-E was obtained.

Comparative Example 2

β-zeolite having a SiO₂/Al₂O₃ mol ratio of 40 in still another lot than those of the zeolite used in Examples 16 to 18 and Comparative example 1 was prepared. The nitrogen content of the β-zeolite was analyzed in accordance with the distillation to isolate ammonia followed by amidosulfuric acid titration, which is prescribed in JIS G1228, similar to the above-described Example 16. As a result, the content was 0.069%. Moreover, the carbon content was 0.03%, and the mass change thereof in a temperature range from 200° C. to 1000° C., which was obtained by the thermogravimetric analysis (TG), was 6.5%. Moreover, pH of a liquid obtained by dispersing and suspending 10 g of the β-zeolite powder into 100 cc of pure water was 5.3.

Next, a HC adsorbent layer was formed by use of the β-zeolite powder as described above in accordance with a method similar to that of Example 16, and then a catalyst component layer containing noble metal was further formed by the similar method, and thus an exhaust gas purifying catalyst-F was obtained.

FIG. 9 is a table showing the values of the characteristics of the zeolite of the above-described Examples and Comparative examples.

[Method of Evaluation]

The exhaust gas purifying catalysts obtained by Examples and Comparative examples, which were shown above, were degraded rapidly under the endurance conditions shown below. Then, the states of the coated layers of the samples were observed by a scanning electron microscope (SEM: S-4000 manufactured by Hitachi, Ltd., magnitude 40 times), and the existence of the breakage and exfoliation of the coated layers was investigated. The SEM images thereof are shown in FIGS. 10A to 10E.

The condition of durability tests

| Engine displacement | 3000 cc |
| Fuel | gasoline (Nisseki Dash) |
| Gas temperature at the catalyst inlet | 800° C. |
| Time of durability | 100 hours |

Consequently, in the catalysts-B, C and D in accordance with Examples 16 to 18 using, as zeolite constituting the HC absorbent layer, the zeolite, in which the nitrogen and carbon contents are low, the weight reduction amount by the thermogravimetric analysis in the temperature range from 200° C. to 1000° C. is low, and the pH of the liquid obtained by suspending the zeolite in water is a value in a predetermined range, it was confirmed that breakage and exfoliation were hardly recognized in the HC adsorbent layer containing the zeolite and the purifying catalyst layer formed on the HC adsorbent layer and that these HC adsorbent layer and purifying catalyst layer exhibit good durability.

On the other hand, in Comparative examples 1 and 2 (catalysts-E and F) using the zeolite, in which the nitrogen content, the weight reduction amount by the TG analysis and the pH value of the suspended liquid are high, it was confirmed that cracks were recognized in the HC adsorbent layer (zeolite layer) and that the purifying catalyst layer partially fell off.

As described above, the HC adsorbent layer for purifying exhaust gas according to the second embodiment is formed by stacking the HC adsorbent layer on the substrate. The adsorbent layer contains the zeolite in which the nitrogen and carbon contents and the weight reduction by the thermogravimetric analysis are small or the zeolite in which the pH value obtained by suspending the same in water is in a predetermined range. Therefore, the generation of gas at the time of the calcining after coating water-based slurry and at the time of being heated up during a drive can be minimized, and the bonding force between the zeolite and the binder can be maintained. Accordingly, the exfoliation of the HC adsorbent layer and the purifying catalyst layer can be prevented as well as the breakage and exfoliation of the zeolite layer itself.

Note that the HC-trap catalyst according to the first embodiment can reduce the occurrence rate of the cracks if the zeolite according to the second embodiment is used as the zeolite constituting the HC adsorbent layer.

The entire contents of Japanese Patent Applications P2002-015010 (filed on Jan. 24, 2002), P2002-33550 (filed on Feb. 12, 2002) and P2002-375121 (filed on Dec. 25, 2002) are incorporated herein by reference. Although the inventions have been described above by reference to certain embodiment of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. An exhaust gas purifying catalyst, comprising:
   a honeycomb substrate which comprises a plurality of cells; and
   a HC adsorbent layer having a total thickness ranging from 100 μm to 500 μm and comprising a plurality of HC adsorbent sub-layers formed on an inner surface of a cell;
   the HC adsorbent sub-layers
   (i) comprising a zeolite,
   (ii) having a closed curve cross-sectional shape or a polygonal cross-sectional shape perpendicular to a direction in which each of the cells is extended, and
   (iii) containing first cracks which extend in an approximately circumferential direction and second cracks which extend in an approximately radial direction;
   wherein the HC adsorbent layer has, in a respective quarter region of the cross-sectional shape, a total number of connection points between intersecting first and second cracks not exceeding 20.

2. The exhaust gas purifying catalyst according to claim 1, wherein
   the cross-sectional shape of the cell comprising the HC adsorbent layer is approximately rectangular.

3. The exhaust gas purifying catalyst according to claim 1, wherein
   a cross-sectional area of gap portions defined by the first cracks and the second cracks is 10% or less of a cross-sectional area of the entire HC adsorbent layer.

4. The exhaust gas purifying catalyst according to claim 1, wherein
   the zeolite comprises a hydrophobic zeolite.

5. The exhaust gas purifying catalyst according to claim 1, wherein
   the zeolite contained in the HC adsorbent layer substantially comprises a β-zeolite having a $SiO_2/Al_2O_3$ mol ratio ranging from 40 to 1000.

6. The exhaust gas purifying catalyst according to claim 1, wherein
   the zeolite substantially comprises a β-zeolite having a $SiO_2/Al_2O_3$ mol ratio ranging from 30 to 70.

7. The exhaust gas purifying catalyst according to claim 1, wherein
   the zeolite has a nitrogen content of 0.05 mass % or less.

8. The exhaust gas purifying catalyst according to claim 1, wherein
   the zeolite has a carbon content of 0.05 mass % or less.

9. The exhaust gas purifying catalyst according to claim 1, wherein
   a weight reduction amount of the zeolite after removing contained moisture is 5 mass % or less in a temperature range from 200° C. to 1000° C., the amount being measured by a thermogravimetric analysis.

10. The exhaust gas purifying catalyst according to claim 1, wherein
a pH of a liquid obtained by dispersing and suspending 10 g of the zeolite into 100 cc of water is 5.0 or less.

11. The exhaust gas purifying catalyst according to claim 1, wherein
a pH of a liquid obtained by dispersing and suspending 10 g of the zeolite into 100 cc of water ranges from 2.0 to 4.0.

12. The exhaust gas purifying catalyst according to claim 7, wherein
the nitrogen content is a value determined by a method, in which the zeolite undergoes acid treatment and alkali treatment, and then ammonium ions extracted by distilling the treated zeolite are titrated.

13. The exhaust gas purifying catalyst according to claim 7, wherein
the nitrogen content is a value determined by a method, in which zeolite powder is treated by any of pure water and a solution-containing an acid, and then an eluted nitrogen-containing component is determined by ion chromatography.

14. The exhaust gas purifying catalyst according to claim 7, wherein
the nitrogen content is a value determined by a method, in which an infrared absorption spectrum of —$NH_4$ is detected by use of an infrared spectrometer.

15. An exhaust gas purifying catalyst, comprising:
a honeycomb substrate which comprises a plurality of cells; and
a HC adsorbent layer having a total thickness ranging from 100 μm to 500 μm and comprising a plurality of HC adsorbent sub-layers formed on an inner surface of a cell;
the HC adsorbent sub-layers
  (i) comprising zeolite,
  (ii) having a closed curve cross-sectional shape or a polygonal cross-sectional shape perpendicular to a direction in which each of the cells of the honeycomb substrate is extended, and
  (iii) having first cracks extended in an approximately circumferential direction and second cracks extended in an approximately radial direction,
wherein the HC adsorbent layer has, in a respective quarter region of the cross-sectional shape, a total number of connection points between intersecting first and second cracks not exceeding 20.

16. The exhaust gas purifying catalyst according to claim 15, wherein
a cross-sectional area of gap portions defined by the first cracks and the second cracks is 10% or less of a cross-sectional area of the entire HC adsorbent layer.

17. The exhaust gas purifying catalyst according to claim 15, wherein
the zeolite comprises a hydrophobic zeolite.

18. The exhaust gas purifying catalyst according to claim 15, wherein
the zeolite contained in the HC adsorbent layer substantially comprises β-zeolite having a $SiO_2/Al_2O_3$ mol ratio ranging from 40 to 1000.

19. The exhaust gas purifying catalyst according to claim 15, wherein
the zeolite substantially comprises β-zeolite having a $SiO_2/Al_2O_3$ mol ratio ranging from 30 to 70.

20. A method of manufacturing an exhaust gas purifying catalyst which comprises:

(a) forming a first HC adsorbent sub-layer comprising cracks therein by
  (i) coating a surface of the cell with a slurry containing a zeolite; and
  (ii) drying the coating or drying and calcining the coating;
(b) forming a second HC adsorbent sub-layer on the first HC adsorbent sublayer by
  (i) coating a surface of the first HC adsorbent sub-layer with a slurry containing a zeolite; and
  (ii) drying the coating or drying and calcining the coating on the surface of the first HC adsorbent sub-layer.

21. The method according to claim 20, wherein
the step of coating a surface of the first HC adsorbent sub-layer further comprises filling cracks in the first HC adsorbent sub-layer.

22. The method according to claim 20, wherein
the second HC adsorbent sub-layer is thinner than the first HC adsorbent sub-layer.

23. The method according to claim 22, wherein
the first HC adsorbent sub-layer has a thickness ranging from 1 to 100 μm, and
the second HC adsorbent sub-layer has a thickness thinner than the first HC adsorbent sub-layer has and ranging from 1 to 20 μm.

24. The method according to claim 22, wherein
the drying of the first HC adsorbent sub-layer and the second HC adsorbent sub-layer is carried out by flowing gas at a temperature ranging from 20 to 90° C. through cells of the honeycomb substrate.

25. The method according to claim 22, wherein
the drying of the first HC adsorbent sub-layer and the second HC adsorbent sub-layer is carried out by flowing gas at a temperature ranging from 20 to 90° C. at a gas flow rate ranging from 2 to 8 m/s through cells of the honeycomb substrate.

26. The method according to claim 20, wherein
zeolite having a nitrogen content of 0.05 mass % is used as the zeolite.

27. The method according to claim 20, wherein
zeolite having a carbon content of 0.05 mass % is used as the zeolite.

28. The method according to claim 20, wherein a pH of the slurry containing the zeolite ranges from 2 to 4.

29. An exhaust-gas purifying catalyst, comprising:
a honeycomb substrate which comprises a plurality of cells; and
a HC adsorbent layer having a total thickness ranging from 100 μm to 500 μm and comprising a plurality of HC adsorbent sub-layers formed on an inner surface of a cell;
the HC adsorbent sub-layers
  i) comprising a zeolite,
  (ii) having a closed curve cross-sectional shape or a polygonal cross-sectional shape perpendicular to a direction in which each of the cells is extended, and
  (iii) containing first cracks which extend in an approximately circumferential direction and second cracks which extend in an approximately radial direction;

wherein the HC adsorbent layer has, in a respective quarter region of the cross- sectional shape, a total number of connection points between intersecting first and second cracks not exceeding 20;

the exhaust-gas purifying catalyst being produced by a process comprising:
(a) forming a first HC adsorbent sub-layer comprising cracks therein by
   (i) coating a surface of a cell in the honeycomb substrate with a slurry containing a zeolite; and
   (ii) drying the coating or drying and calcining the coating;
b) forming a second HC adsorbent sub-layer on the first HC adsorbent sub- layer by
   (i) coating a surface of the first HC adsorbent sub-layer with a slurry containing a zeolite; and
   (ii) drying the coating or drying and calcining the coating on the surface of the first HC adsorbent sub-layer.

30. The exhaust-gas purifying catalyst produced according to the method of claim 29, wherein the second HC adsorbent sub-layer partially fills a crack in the first HC adsorbent sub-layer.

* * * * *